US012044063B2

(12) United States Patent
Nikitin

(10) Patent No.: US 12,044,063 B2
(45) Date of Patent: Jul. 23, 2024

(54) ADAPTABLE INSULATING GLAZING UNIT (VARIANTS)

(71) Applicant: Andrey Valentinovich Nikitin, Moscow (RU)

(72) Inventor: Andrey Valentinovich Nikitin, Moscow (RU)

( * ) Notice: Subject to any disclaimer, the term of this patent is extended or adjusted under 35 U.S.C. 154(b) by 378 days.

(21) Appl. No.: 17/605,178

(22) PCT Filed: Jul. 8, 2019

(86) PCT No.: PCT/RU2019/000485
§ 371 (c)(1),
(2) Date: Oct. 20, 2021

(87) PCT Pub. No.: WO2021/002768
PCT Pub. Date: Jan. 7, 2021

(65) Prior Publication Data

US 2022/0186549 A1 Jun. 16, 2022

(30) Foreign Application Priority Data

Jul. 1, 2019 (RU) ........................... RU2019120384

(51) Int. Cl.
*E06B 3/663* (2006.01)
*E06B 3/66* (2006.01)

(52) U.S. Cl.
CPC ........ *E06B 3/66366* (2013.01); *E06B 3/6617* (2013.01); *E06B 3/66342* (2013.01);
(Continued)

(58) Field of Classification Search
CPC ............... E06B 3/6617; E06B 3/66342; E06B 3/66361; E06B 3/66366; E06B 2003/66385; E06B 2003/6638
See application file for complete search history.

(56) References Cited

U.S. PATENT DOCUMENTS

2009/0139163 A1* 6/2009 Prete .................. E06B 3/66366 52/204.593
2010/0011703 A1* 1/2010 Seele ...................... E06B 3/663 52/786.1

(Continued)

FOREIGN PATENT DOCUMENTS

DE 10160003 A1 6/2003
FR 2582345 A1 * 5/1985

(Continued)

*Primary Examiner* — Christine T Cajilig
(74) *Attorney, Agent, or Firm* — John Alumit

(57) ABSTRACT

The invention relates generally to the field of construction, and in particular to the use of a glass unit instead of the opening sashes of windows and doors, without using sash profiles into which conventional insulating glass units or insulating glass units with one protruding outer pane are usually fixed. The adaptive insulating glass unit is intended for use on windows and doors pre-installed in an opening or facade, as well as for use in the production of new windows and doors, which in turn are used for glazing door and window openings (fixed glazing or one with a sash opening inward, sideways, outward or upward off the frame) in residential buildings, in public and industrial buildings, display structures. The technical result of the invention is a quicker and more accurate assembly of multi-chambered insulating glass units with glued-in profiles, increased light transmission, thermal insulation and soundproofing properties of existing window and door systems without the need to reconfigure production processes, without the need to readjust and replace equipment used in the production of windows, as well as increased light transmission, thermal insulation and soundproofing properties of window and door systems pre-installed in the openings and facades of buildings without the need to reinstall them. The adaptive insulating glass unit designed to be used instead of the opening sashes of windows and doors, without the use of sash profiles into which conventional insulating glass units or insulating glass units with one protruding outer pane are usually fixed, offers new prospects for the design of new window and door systems. The adaptive insulating glass unit contains two outer panes and at least one inner pane, spaced from each other by spacer frames placed between the panes. Moreover, the outer panes are always larger than the inner
(Continued)

ones, and between them there is a profile inserted all the way to all the inner panes and simultaneously to one of the outer panes and glued to said outer pane by means of hard glue with additional fixation of the glued profile to another outer pane through the aid of a spacer element, with the gap formed between the profile and the outer pane to which the profile is not glued by means of hard glue filled with elastic glue and sealant, with the outer part of the profile adapted to fixing fittings and seals, which adapt the adaptive insulating glass unit to specific window systems.

12 Claims, 6 Drawing Sheets

(52) U.S. Cl.
CPC ..................... *E06B 3/66361* (2013.01); *E06B 2003/6638* (2013.01); *E06B 2003/66385* (2013.01)

(56) References Cited

U.S. PATENT DOCUMENTS

2011/0133940 A1* 6/2011 Margalit ............. E06B 3/66366 52/204.593
2017/0321473 A1 11/2017 Frank et al.
2018/0038151 A1* 2/2018 Clarahan .................. E06B 7/02

FOREIGN PATENT DOCUMENTS

WO WO 2004/005783 A1 1/2004
WO WO 2019/081784 A1 5/2019

* cited by examiner

-PRIOR ART-

-PRIOR ART-

-PRIOR ARTa b

-PRIOR ARTa b

-PRIOR ART-

ADAPTABLE INSULATING GLAZING UNIT (VARIANTS)

TECHNICAL FIELD

The invention relates generally to the field of construction, and in particular to the use of a glass unit instead of the opening sashes of windows and doors, without using sash profiles into which conventional insulating glass units or insulating glass units with one protruding outer pane are usually fixed. The adaptive insulating glass unit is intended for use on windows and doors pre-installed in an opening or facade, as well as for use in the production of new facades, windows and doors, which in turn are used for glazing facades, door and window openings (fixed glazing or one with a sash opening inward, sideways, outward or upward off the frame) in residential buildings, in public and industrial buildings, display structures.

BACKGROUND OF THE INVENTION

An insulating glass unit is known in the prior art, the prototype, which is the closest analogue disclosed in DE 19733154 A1, publ. Feb. 4, 1999. An insulating glass unit consists of a pane located outside the building, a pane located inside the building with a peripheral edge projection opposite the outer pane, with a spacer element that is installed at the edge between the outer and inner panes with a gas seal, as well as an outwardly open U-shaped profile between the panes for fittings, which is also located at the edge of the spacer element and separated from it. Moreover, the outer frame is at least partly formed by additional insulating glazing, consisting of the pane located inside the building, the outer pane with the edge projection located opposite the pane in the area related to the sash structure, and the spacer element that is installed gas-tight at the edge between the inner and outer panes. Moreover, the zone that belongs to the sash structure further provides for a profile between the panes separated from the spacer element, which is closer to the sash structure than the spacer element, that is in the zone related to the sash structure, between the panes there is a profile separated from the spacer element, which is closer to the sash structure than the spacer element, which serves to accept fittings that can interact with the fittings of the sash structure, and the seals that can interact with the sash structure.

The disadvantage of the above-disclosed technical solution is the complexity of manufacture of a glass unit with a glued-in profile due to the non-parallelism of planes between the outer panes caused by the glass units press assembly technology, which becomes even more pronounced when the glass unit undergoes the stage of gluing in the profile, which subsequently leads to:

- complexity of positioning the profile relative to the edges of the outer panes;
- impossibility to create uniform pressure to the outer panes when gluing in the profile;
- uneven gluing of the edge zones;
- increased risk of unit depressurization;
- high reject rate when assembling the finished product.

At the stage where the glued-in profile is inserted during the assembly of the glass unit, problems arise associated with the positioning of the profile both before pressurization of the glass unit with the glued-in profile in the assembly line, and after pressurization, since the glued-in profile gets uncontrollably displaced under pressure, resulting in a defective product. In addition, existing technologies enable relatively easy assembly of a glass unit with one chamber between two panes and a glued-in profile. However, in cases where there are two or more chambers and more than two panes, significant problems arise associated with the assembly of two- and three-chambered glass units with a glued-in profile due to the unfitness of the existing assembly lines for performing said operation in automatic mode. All latter-day two- and three-chambered glass units with a large glazed area, and especially those featuring glass sheets with thin nominal parameters, are assembled on automatic lines in a position close to vertical. Thus, it is possible to insert and glue in the profile into them only after the insulating glass unit has been assembled with two extreme protruding panes by subjecting the ready-assembled glass unit from the assembly line to gluing in of the profile into it in order to adapt the multi-chambered insulating glass unit to specific window and door systems.

DISCLOSURE OF THE INVENTION

The objective of the invention claimed is the development of an adaptive insulating glass unit with high consumer properties, which can be used for the installation of windows with a sash opening outward, sideways, upward and inward off the frame, fixed windows, as well as doors.

The technical result of the invention is fast and accurate positioning of the glued-in profile, which should ensure firmly secured fittings and seals and their normal function by means of creating of uniform pressure on the outer panes when gluing in the profile and ensuring the stable position of the panes of the adaptive insulating glass unit relative to each other and its tightness irrespective of the error in the parallelism of the outer panes arising during the production of a glass unit on the assembly line and its natural deformation during the installation and gluing in of the profile. The technical result is attained through the aid of an additional spacer element that presses the profile to the panes until the polymerization of the glue that fixes the profile to the pane and through the aid of an elastic adhesive sealant that fills the gap between the profile parts as per claimed embodiments 1 and 3, and between the profile and the pane as per claimed embodiment 2, and additionally secures the spacers, with the combined action of the profile, elastic adhesive sealant and spacers further protecting the panes from shifting during operation.

Additional technical results are also attained:

- increased light transmission, thermal insulation and soundproofing properties of existing window and door systems, when using an adaptive insulating glass unit, without the need to reconfigure production processes and without the need to readjust and replace equipment in order to produce windows with improved specifications on existing production sites;
- increased light transmission, thermal insulation and soundproofing properties of window and door systems pre-installed in openings and facades of buildings without the need to reinstall them;
- expanded use of glass units through the use of adaptive insulating glass units in the design of new window and door systems without the need to embed glass units into the casement profiles of windows and doors;
- increased labor productivity in the assembly of windows and doors through the reduction of the number of operations associated with the production of windows and doors.

The specified technical result is attained through the aid of a claimed adaptive insulating glass unit as per the first embodiment, containing two outer panes and at least one inner pane, distanced from each other by means of spacer frames placed between the panes, whereby the panes and spacer frames are glued together so that they form sealed chambers between the panes and spacer frames, whereby the spacer frames are designed with a possibility of adsorbing moisture contained in the closed space of said formed chambers, whereby the outer panes are always bigger than the inner panes, with the edges of the outer panes being painted over at least to the surface of the spacer frame of the sealed chamber facing inwards, and between them there is the first part of the profile that is inserted all the way to the ends of the inner panes and simultaneously to one inner plane of one of the outer panes and glued to this outer pane with additional fixation of the glued first part of the profile through the aid of a spacer element and to the second part of the profile, which is glued to the opposite outer pane, with the gap formed between the first part of the profile and the second part of the profile being filled with an elastic adhesive sealant, with the outer part of the profiles being designed with a possibility of fixing the fittings and seals in order to adapt the adaptive insulating glass unit to specific window systems.

According to the first embodiment of the invention, there is an absorbent element placed in the space between the spacer frames and the sealant between the first and second part of the profile.

According to the first embodiment of the invention, the ends of the spacer frames that do not face inwards the sealed chamber can be treated around the perimeter with a sealant.

According to the first embodiment of the invention, the edges of the inner panes are painted over around the perimeter from the edge and at least up to and including the area of adhesive layer that connects the panes with spacer frames.

The specified technical result is attained through the aid of a claimed adaptive insulating glass unit as per the second embodiment, containing two outer panes and at least one inner pane, distanced from each other by means of spacer frames placed between the panes, whereby the panes and spacer frames are glued together so that they form sealed chambers between the panes and spacer frames, whereby the spacer frames are designed with a possibility of adsorbing moisture contained in the closed space of said formed chambers, whereby the outer panes are always bigger than the inner panes, with the edges of the outer panes being painted over at least to the surface of the spacer frame of the sealed chamber facing inwards, and between them there is the profile that is inserted all the way to the ends of the inner panes and simultaneously to the inner plane of one of the outer panes and glued to this outer pane with additional fixation of the glued profile through the aid of a spacer element for the opposite outer pane, with the gap formed between the profile and the opposite outer pane being filled with an elastic adhesive sealant, with the outer part of the profile being designed with a possibility of fixing the fittings and seals in order to adapt the adaptive insulating glass unit to specific window systems.

According to the second embodiment of the invention, there is an absorbent element placed in the space between the spacer frames and the sealant between the profile and one of the outer panes.

According to the second embodiment of the invention, the ends of the spacer frames that do not face inwards the sealed chamber can be treated around the perimeter with a sealant.

According to the second embodiment of the invention, the edges of the inner panes are painted over around the perimeter from the edge and at least up to and including the area of adhesive layer that connects the panes with spacer frames.

The specified technical result is attained through the aid of a claimed adaptive insulating glass unit as per the third embodiment, containing two outer panes and at least one inner pane, distanced from each other by means of spacer frames placed between the panes, whereby the panes and spacer frames are glued together so that they form sealed chambers between the panes and spacer frames, whereby the spacer frames are designed with a possibility of adsorbing moisture contained in the closed space of said formed chambers, whereby the outer panes are always bigger than the inner panes, with the edges of the outer panes being painted over at least to the surface of the spacer frame of the sealed chamber facing inwards, and between them there is the first part of the profile that is inserted all the way to the ends of the inner panes and simultaneously to one inner plane of one of the outer panes and glued to this outer pane with additional fixation of the glued first part of the profile through the aid of a spacer element and to the second part of the profile, which is glued to the opposite outer pane and also rests against the ends of the inner panes, with the gap formed between the first part of the profile and the second part of the profile being filled with an elastic adhesive sealant, with the outer part of the profile being designed with a possibility of fixing the fittings and seals in order to adapt the adaptive insulating glass unit to specific window systems.

According to the third embodiment of the invention, there is an absorbent element placed in the space between the spacer frames and the sealant between the first and second part of the profile.

According to the third embodiment of the invention, the ends of the spacer frames that do not face inwards the sealed chamber can be treated around the perimeter with a sealant.

According to the third embodiment of the invention, the edges of the inner panes can be painted over around the perimeter at least up to and including the area of adhesive layer that connects the spacer frames with panes.

BRIEF DESCRIPTION OF DRAWINGS

The invention may best be understood by reference to the following non-limiting description taken in connection with the accompanying drawings in which.

Figure 1:
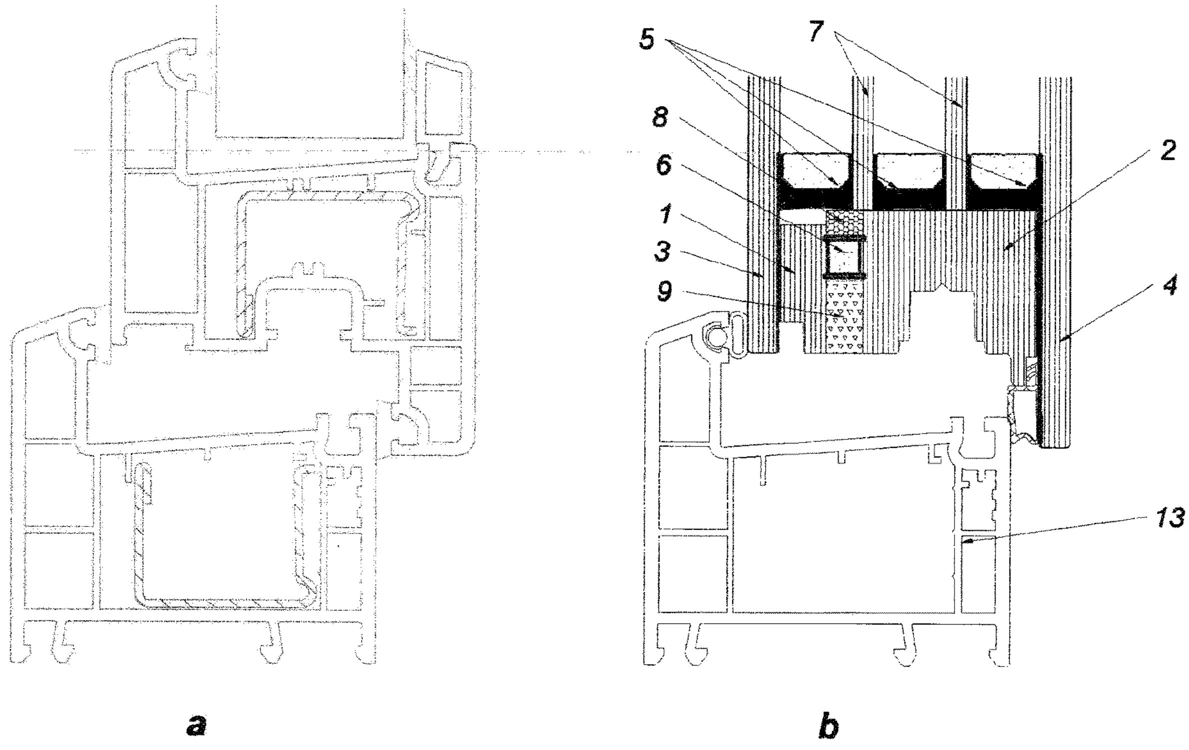
FIG. 1—Comparison of a conventional window structure based on PVC profiles (a) consisting of a frame and a sash with a glass unit of a standard design mounted in it with the structure of the claimed adaptive insulating glass unit replacing an inward-opening sash with a PVC frame (b) and eccentric spacer elements.

1—first part of the profile; 2—second part of the profile; 3—first outer pane; 4—second outer pane; 5—spacer frame; 6—spacer element; 7—inner pane; 8—absorbent element; 9—layer of sealant; 10—profile; 11—drip strip; 12—sill; 13—frame; 14—building wall; 15—layer of hardened foam.

DETAILED DESCRIPTION OF THE EMBODIMENTS

The claimed adaptive insulating glass unit is assembled as follows. Two outer panes (3, 4) and the inner pane (7) located between them are interconnected in sequence through the aid of spacer frames (5) using a conventional press designed for the assembly of glass units. However, the outer panes (3, 4) have both greater length and greater width than the inner pane, with their edges protruding beyond the outer part of the spacer frames. Alternatively, the outer part of the spacer frames is sealed around the perimeter with adhesive sealant. As a result, there are sealed chambers formed between the panes (3, 4, 7), which can be filled with an inert gas. Then the profile (10) is installed, which can be made of wood or polymer material with similar or better thermal insulation properties, selected in such a way that the temperature of the inner pane corresponds to the specified operating parameters and the density of the profile material enables to fix the fittings in it; for this purpose, one of the profile surfaces (10) is treated with glue, and then the other surface of the profile, located at an angle of 90 degrees to the surface treated with glue, is pressed against the ends of the inner panes (7), and then the part of the profile treated with glue is pressed against the inner surface of the outer pane (4) (the inner surface of the pane protrudes beyond the outer part of the spacer frames). Since the width of the profile (10) is less than the distance between the outer panes (3, 4), there is a space formed between the profile (10) and the outer pane (3), into which the adsorbent element (8) and the spacer element (6) are inserted. Then, the spacer element (6) is used to create pressure that is high enough for effective bonding of the glue-treated surface of the profile (10) to the inner surface of the outer pane (4), but not enough to cause the destruction of the panes and depressurization of the glass unit. Spacer elements are installed as often as necessary in order to create even pressure over the entire bonded area. The installation frequency of the spacer elements is selected experimentally or by calculation and depends on the profile material, geometric shape of the profile, weight of the panes and operating conditions of the adaptive insulating glass unit. The spacer elements are executed in any of the known ways, for example, in the form of spacer paired wedges, in the form of an eccentric, in the form of a helical spacer element. The pressure generated by them, depending on the type of spacer element, can be adjusted manually, by hand through the aid of a torque wrench, electronically, mechanically, or by a combination of said control methods. The profile (10) is installed along the entire circumference of the glass unit and connected in the corners of the glass unit with a miter cut or counter-profile or a pin/eyelet, or by other known methods. After attaching the spacer (6) to the profile (10) and creating the required pressure, the formed space is filled with a layer of adhesive sealant (9). The profile (10) is typically obtained by milling, and it is a mating part to the window or door frame, into which an adaptive glass unit will be inserted, just as a sash with a glass unit would be inserted. Where the claimed glass unit is used for the opening sashes, fittings and seals are fixed on the outer surface of the profile (10), holes and cutouts are made in the outer panes for fixing the fittings in order to adapt the adaptive insulating glass unit to specific window systems, and the adaptive insulating glass unit is installed in the window frame, including in the existing frame (without dismantling it from the facade or wall opening) when replacing the sash. Where the claimed glass unit is used for the fixed glazing, for example, of a building, it is installed in the window opening of the building (without the use of a frame) or in the window frame when replacing the glass unit in the existing frame (without dismantling it). The claimed glass unit is installed in the opening of the building with a certain gap (which is taken into account in the manufacture of a glass unit of the required dimensions) around the perimeter between the wall of the building, and said gap is foamed with the formation of a layer of hardened foam (15), followed by installation of a window sill (12) inside the premises and of a drip strip (11) outside.

Figure 2:
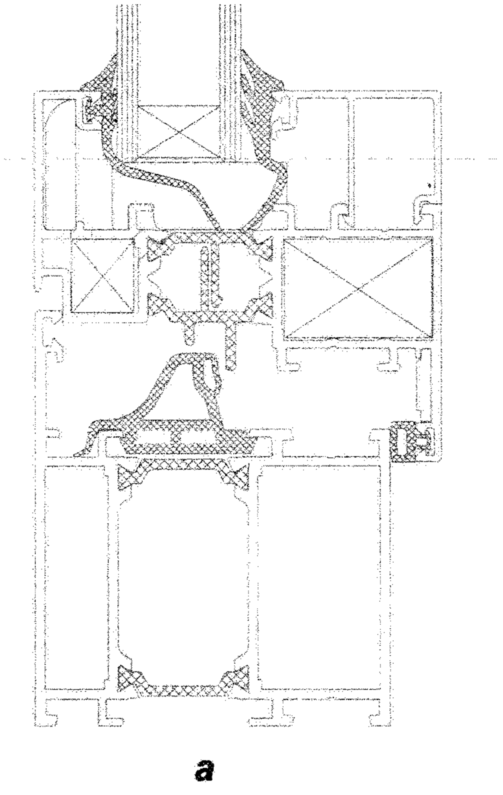
FIG. 2—Comparison of a conventional window structure based on aluminum profiles (a) consisting of a frame and a sash with a glass unit of a standard design mounted in it with the structure of the claimed adaptive insulating glass unit replacing an inward-opening sash with an aluminum frame (b) and wedge-pair spacer elements.
Figure 2:
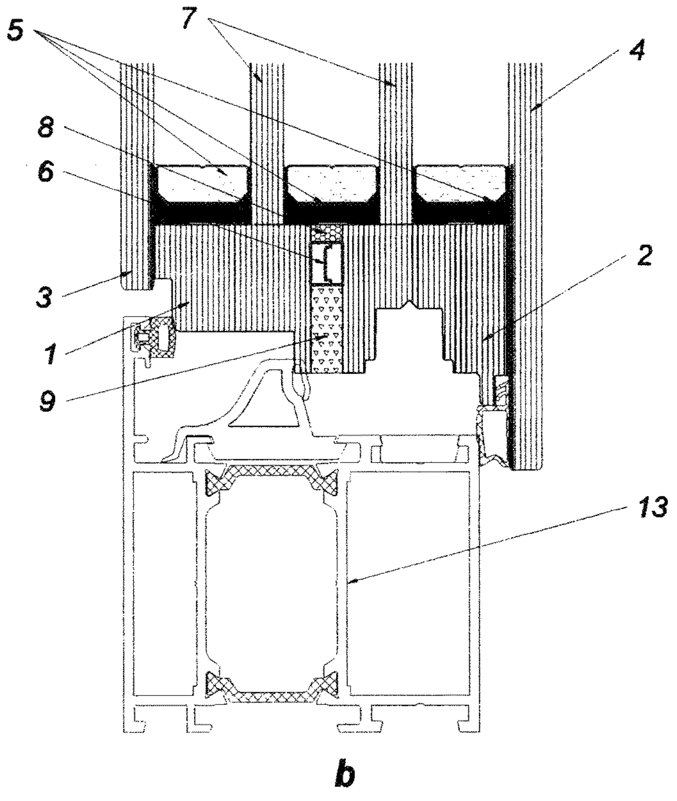
Figure 3:
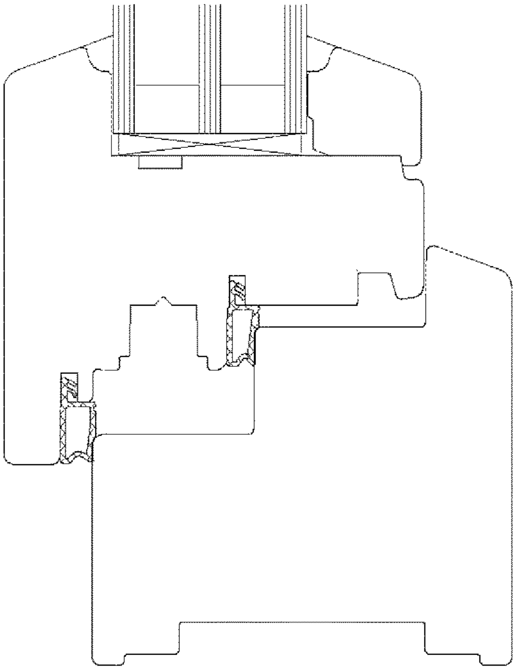
FIG. 3—Comparison of a conventional outward-opening window structure based on wooden profiles (a) consisting of a frame and a sash with a glass unit of a standard design mounted in it with the structure of the claimed adaptive insulating glass unit replacing an outward-opening sash with a wooden frame (b) and eccentric spacer elements.
Figure 3:
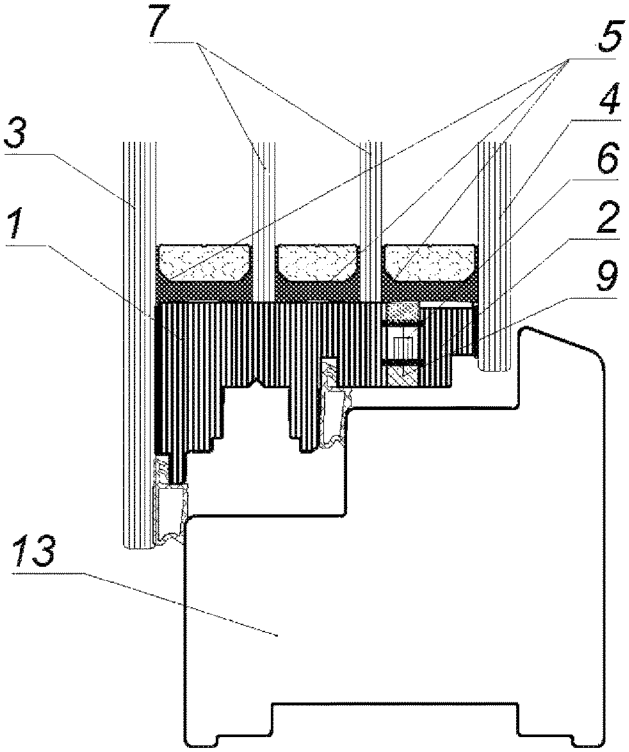
Figure 4:
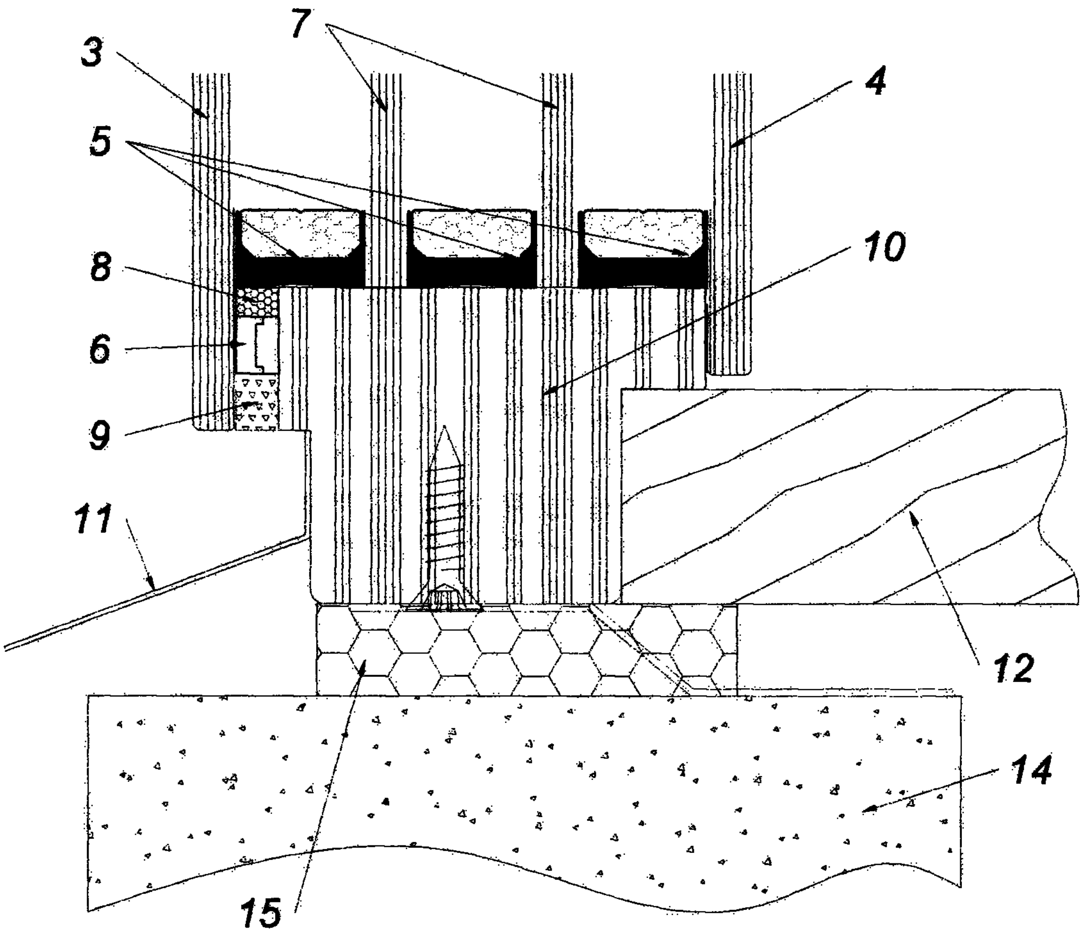
FIG. 4—Structure of the claimed adaptive insulating glass unit for fixed glazing with wedge-pair spacer elements.
Figure 5:
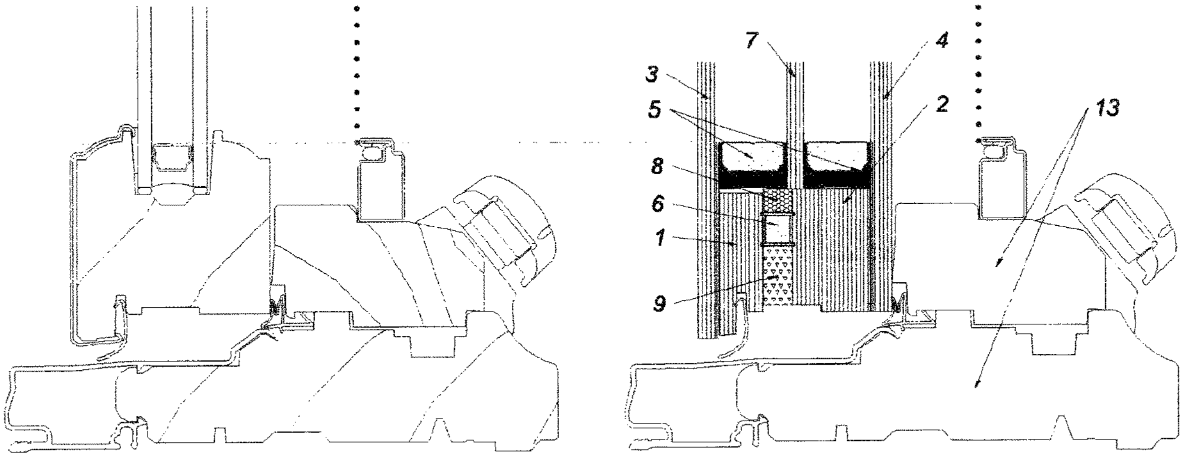
FIG. 5—Comparison of a conventional window structure based on wooden-aluminum profiles (a) consisting of a frame and an outward-opening sash with a glass unit of a standard design mounted in it with the structure of the claimed adaptive insulating glass unit replacing an outward-opening sash with a wooden-aluminum frame (b) and eccentric spacer elements.
Figure 6:
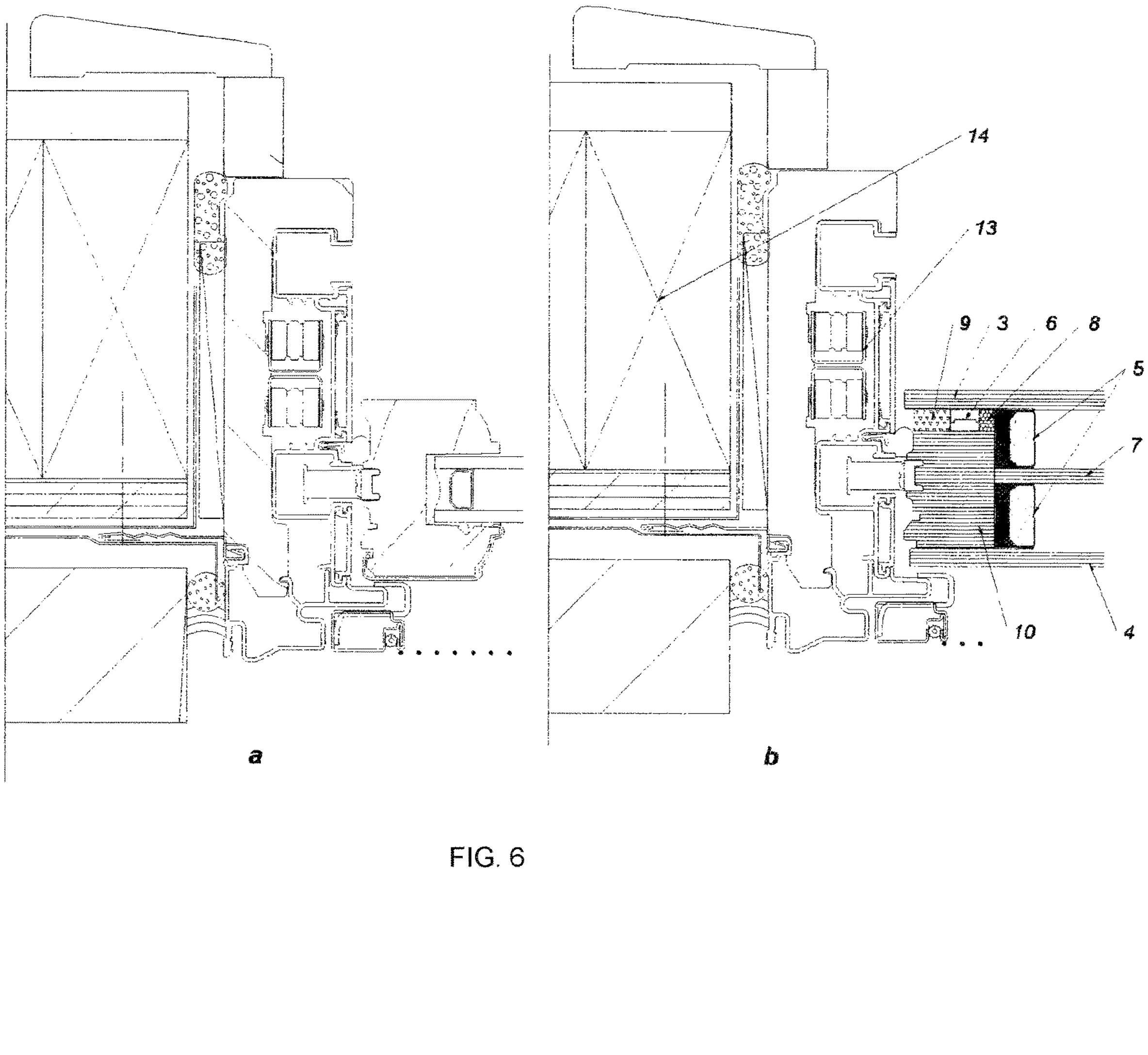
FIG. 6—Comparison of a conventional window structure based on wooden-aluminum profiles (a) consisting of a frame and an upward-opening sash with a glass unit of a standard design mounted in it with the structure of the claimed adaptive insulating glass unit replacing an upward-opening sash with a wooden-aluminum frame (b) and wedge-pair spacer elements.

The claimed design of the adaptive insulating glass unit (FIG. 1-6) allows it to be built into translucent structures, for example, into windows without a casement profile, with the use of a profile, whose outer surface is made to match the frame (including the pre-installed frame, i.e. without dismantling it). However, the claimed glass unit is used for the fixed glazing, it is fixed in the window opening (without the use of a frame). The adaptive insulating glass unit can also be used in sashes that open upward, outward or inward, as well as for fixed glazing using various frame materials (PVC, wood, wood-aluminum, aluminum), which enables to expand its scope of application without embedding it in the casement window profiles. Since the structures of windows and doors often have profile elements of sashes of different sizes on different sides, which is typically due to the need to use certain fittings, the glued-in profiles of the adaptive glass unit can also have different sizes on different sides.

The use in the claimed adaptive insulating glass unit of a profile, whose one surface rests on the inner surface on the plane of the protruding edge of the outer pane, and whose other surface rests on the ends of the inner panes, provides a sufficient number of profile support points in the glass unit, which yields accurate and fast positioning of the profile around the circumference of the glass unit, reduced reject rate in the manufacture of glass units, and, ultimately, normal operation of fittings and seals accurately positioned in the adaptive glass unit.

Spacer elements used in the claimed adaptive insulating glass unit allow dosing pressure when bonding the profile to the pane through the distribution of pressure from the spacer element over a large plane, which reduces the risks of depressurization and destruction of the glass unit.

The claimed adaptive insulating glass unit allows increasing consumer properties-light transmission, energy efficiency, noise insulation—since the absence of a frame profile allows increasing the area of the translucent part, increasing the number of chambers with the same frame width in comparison with conventional glass units, which are mounted in a frame profile, increasing the thickness of the glass unit, designing the glass unit using thicker and heavier panes without the risk of loss of geometry, as is the case with the use of conventional sashes with heavy glass units.

The manufacturing productivity of the claimed glass unit is increased by simplifying the profile positioning relative to the edge of the outer panes and reducing the material consumption.

The invention has been disclosed above with reference to a specific embodiment. Other embodiments of the invention may be obvious to persons skilled in the art without changing its essence, as it is disclosed in the present description. Accordingly, the invention should be considered limited in scope only by the following claims.

The invention claimed is:

1. An adaptive insulating glass unit, containing two outer panes and at least one inner pane, distanced from each other by means of spacer frames placed between the panes, whereby the panes and spacer frames are glued together so that they form sealed chambers between the panes and spacer frames, whereby the spacer frames are designed with a possibility of adsorbing moisture contained in a closed space of said formed chambers, wherein the outer panes are always bigger than the inner panes, with the edges of the outer panes being painted over at least to the surface of the spacer frame of the sealed chamber facing inwards, and between them there is a first part of the profile that is inserted all the way to the ends of the inner panes and simultaneously to one inner plane of one of the outer panes and glued to this outer pane with additional fixation of the glued first part of the profile through the aid of a spacer element and to a second part of the profile, which is glued to the opposite outer pane, with a gap formed between the first part of the profile and the second part of the profile being filled with an elastic adhesive sealant, with an outer part of the profile being designed with a possibility of fixing fittings and seals in order to adapt the adaptive insulating glass unit to specific window systems.

2. An adaptive insulating glass unit as claimed in claim 1 wherein there is an absorbent element placed in a space between the spacer frames and the sealant between the first and second part of the profile.

3. An adaptive insulating glass unit as claimed in claim 1 wherein ends of the spacer frames that do not face inwards the sealed chamber can be treated around the perimeter with a sealant.

4. An adaptive insulating glass unit as claimed in claim 1 wherein edges of the inner panes are painted over around the perimeter from the edge and at least up to and including the area of adhesive layer that connects the inner panes with spacer frames.

5. An adaptive insulating glass unit, containing two outer panes and at least one inner pane, distanced from each other by means of spacer frames placed between the panes, whereby the panes and spacer frames are glued together so that they form sealed chambers between the panes and spacer frames, whereby the spacer frames are designed with a possibility of adsorbing moisture contained in a closed space of said formed chambers, wherein the outer panes are always bigger than the inner panes, with the edges of the outer panes being painted over at least to the surface of the spacer frame of the sealed chamber facing inwards, and between them there is the profile that is inserted all the way to the ends of the inner panes and simultaneously to the inner plane of one of the outer panes and glued to this outer pane with additional fixation of the glued profile through the aid of a spacer element disposed between two surfaces of the profile or between a surface of the profile and an inner surface of an outer pane to create pressure between these two surfaces for effective bonding, with a gap formed between the profile and the opposite outer pane being filled with an elastic adhesive sealant, with an outer part of the profile being designed with a possibility of fixing fittings and seals in order to adapt the adaptive insulating glass unit to specific window systems; and wherein in the case where the spacer element is disposed between a surface of the profile and an inner surface of an outer plane, the spacer element also separates an absorbent sealant from the elastic adhesive sealant.

6. An adaptive insulating glass unit as claimed in claim 5 wherein there is an absorbent element placed in a space between the spacer frames and the sealant between the profile and one of the outer panes.

7. An adaptive insulating glass unit as claimed in claim 5 wherein ends of the spacer frames that do not face inwards the sealed chamber can be treated around the perimeter with a sealant.

8. An adaptive insulating glass unit as claimed in claim 5 wherein edges of the inner panes are painted over around the perimeter from the edge and at least up to and including the area of adhesive layer that connects the inner panes with spacer frames.

9. An adaptive insulating glass unit, containing two outer panes and at least one inner pane, distanced from each other by means of spacer frames placed between the panes, whereby the panes and spacer frames are glued together so that they form sealed chambers between the panes and spacer frames, whereby the spacer frames are designed with a possibility of adsorbing moisture contained in a closed space of said formed chambers, wherein the outer panes are always bigger than the inner panes, with the edges of the outer panes being painted over at least to the surface of the spacer frame of the sealed chamber facing inwards, and between them there is a first part of the profile that is inserted all the way to the ends of the inner panes and simultaneously to one inner plane of one of the outer panes and glued to this outer pane with additional fixation of the glued first part of the profile through the aid of a spacer element and to a second part of the profile, which is glued to the opposite outer pane and also rests against the ends of the inner panes, with a gap formed between the first part of the profile and the second part of the profile being filled with an elastic adhesive sealant, with an outer part of the profile being designed with a possibility of fixing fittings and seals in order to adapt the adaptive insulating glass unit to specific window systems.

10. An adaptive insulating glass unit as claimed in claim 9 wherein there is an absorbent element placed in a space between the spacer frames and the sealant between the first and second part of the profile.

11. An adaptive insulating glass unit as claimed in claim 9 wherein ends of the spacer frames that do not face inwards the sealed chamber can be treated around the perimeter with a sealant.

12. An adaptive insulating glass unit as claimed in claim 9 wherein edges of the inner panes are painted over around the perimeter from the edge and at least up to and including the area of adhesive layer that connects the inner panes with spacer frames.

* * * * *